United States Patent [19]

Shaltiel

[11] 3,917,527

[45] Nov. 4, 1975

[54] HYDROPHOBIC CHROMATOGRAPHY

[75] Inventor: Shmuel Shaltiel, Rehovot, Israel

[73] Assignee: Yeda Research & Development Co., Ltd., Rehovot, Israel

[22] Filed: May 14, 1973

[21] Appl. No.: 360,303

[30] Foreign Application Priority Data

Apr. 17, 1973 Germany.......................... 2319495

[52] U.S. Cl. .......................... 210/31 C; 210/198 C
[51] Int. Cl.² ........................................ B01D 15/08
[58] Field of Search ..................... 210/31 C, 198 C

[56] References Cited
UNITED STATES PATENTS

| | | |
|---|---|---|
| 3,002,823 | 10/1961 | Flodin et al.................. 210/31 C X |
| 3,350,174 | 10/1967 | Mattenheimm............... 210/31 C X |
| 3,527,712 | 9/1970 | Renn et al........................ 210/31 C |
| 3,536,614 | 10/1970 | Frisque et al. ................... 210/31 C |
| 3,692,669 | 9/1972 | Bauman........................... 210/31 C |

*Primary Examiner*—John Adee
*Attorney, Agent, or Firm*—Ostrolenk Faber Gerb & Soffen

[57] ABSTRACT

Biomolecules such as peptides, vitamins, hormones, lipids, proteins and enzymes as well as membranes, cells and the like are separated and purified using one or more members of a homologous series of chromatographic adsorbents having hydrocarbon arms of predetermined length attached thereto.

20 Claims, No Drawings

HYDROPHOBIC CHROMATOGRAPHY

BACKGROUND OF THE INVENTION

In the past, conventional procedures for the separation and purification of proteins were based on differences in their solubility, charge, size and shape. More recently, a new approach for protein purification was developed, which makes use of the specific biological affinity between proteins and their substrates, activators, inhibitors etc. [for a review see Cuatrecasas and Anfinsen, *Methods in Enzymology* 23, 345 (1972)]. The method used is often referred to as "affinity chromatography" [Cuatrecasas, Wilchek and Anfinsen, *Proc. Nat. Acad. Sci.* USA 61, 636 (1968)] or "immunospecific purification" [(Campbell, Luescher and Lerman, *Proc. Nat. Acad. Sci.* USA 37, 575 (1951)]. Thus, a solution containing the macromolecule to be purified is passed through a column containing a water insoluble support, onto which an appropriate ligand has been covalently attached. The macromolecules that do not exhibit appreciable affinity for the ligand will pass unretarded through the column, while those which recognize the ligand and bind to it will be retarded. The specifically adsorbed protein can then be eluted by any one of a number of procedures which will effect dissociation as, for example, by altering the composition of the solvent.

To improve the effectiveness of affinity chromatography columns, Cuatrecasas suggested the use of hydrocarbon "arms" between the ligand and the matrix backbone, in order to relieve steric restrictions imposed by the carrier and to increase the flexibility and mobility of the ligand which will thus protrude further into the solvent [Cuatrecasas, *J. Biol. Chem.* 245, 3059 (1970); *Nature*, 228, 1327 (1970)].

I have found that coating agarose beads with covalently bound hydrocarbon chains endows the agarose with the capacity of binding various proteins even when no biospecific ligand is attached to those hydrocarbon arms. This observation has led to systematic studies with homologous series of hydrocarbon-coated agaroses and to the demonstration that various proteins can be rather selectively adsorbed onto the different members of the above mentioned series of hydrocarbon-coated agaroses.

Yon, *Biochem. J.* 126, 765–767 (1972) discovered that certain lipophilic proteins could be bound to an affinity chromatography adsorbent having a $C_{10}$ hydrocarbon chain terminated in an amino group, normally used for attaching the biospecific ligand to the hydrocarbon arm. Yon theorized that the ability of this particular adsorbent to react with these particular lipophilic proteins was the result of hydrophobic interaction involving the $C_{10}$ chains and electrostatic interactions involving the terminal ionic group.

I have discovered that an adsorbent composed of a support and hydrocarbon extensions or arms of specific carbon atom length will selectively and reversibly bind a specific macromolecule. By varying the carbon atom length of the arm and the conditions of chromatography, I have been able to obtain a specific adsorbent for every macromolecule I have tested. I have further found that a particular terminal end group is not critical although it can be employed. Yon thus teaches a specific example of the discovery of this invention.

The mechanics of binding the macromolecule in the present invention is generally the same as the mechanics of affinity chromatography. Those skilled in the art will recognize, however, that the theoretical basis and mechanism for the present invention and that of affinity chromatography are quite different. In affinity chromatography, the biospecific ligand is considered indispensible and the effect of the length of the hydrocarbon extension or arm was attributed to a relief of steric restrictions imposed by the matrix backbone and to an increased flexibility and mobility of the ligand when it protrudes further into the solvent. In the present invention, hydrophobic interactions between the arms and the macromolecules cause binding through a mechanism which does not involve specific biological recognition of the ligand per se.

SUMMARY OF THE INVENTION

This invention relates to the selective and reversible binding of a macromolecule to an adsorbent comprising a carrier having attached thereto a hydrocarbon extension or arm of predetermined carbon atom length and to a method of determining the number of carbon atoms in the arm which will selectively and reversibly bind the desired macromolecule. The invention also provides a package containing a series of small chromagraphic columns which are used for rapid identification of the specific adsorbent most effective in the purification of a particular macromolecule.

DESCRIPTION OF THE PREFERRED EMBODIMENTS

The adsorbent of the present invention comprises a solid matrix support having attached thereto hydrocarbon arms. The water-insoluble, porous carriers can be derivatives of cellulose, polystyrene, synthetic polyamino acids, synthetic polyacrylamide gels, crosslinked dextran derivatives or even glass surface. As in affinity chromatography, I have found that a good carrier is agarose, a polysaccharide polymer. The beaded agarose derivatives have a very loose structure which allows molecules with a molecular weight in the millions to diffuse readily through the matrix. These polysaccharides can readily undergo substitution reactions by activation with cyanogen halides [Axen, Porath and Ernback, *Nature* 214, 1302 (1967); Porath, Axen and Ernback, *Nature* 215, 1941 (1967)] are very stable, and have a moderately high capacity for substitution. Agarose is available commercially in beaded, spherical form, in various pre-graded sizes and porosities. One example of a commercially available agarsoe is Sepharose 4B.

The hydrocarbon extensions or arms are covalently attached to the carrier through a difunctional linking group such as —NH—, —S—, —COO—, and the like. The hydrocarbon extension or arm can be any alkyl, aryl, aralkyl, alkylaryl, alkylaralkyl, etc., group. The arms can be saturated or unsaturated, branched or substituted with other functional groups. The hydrocarbon arm will contain one to 20 or more carbon atoms, depending on the reagent used to prepare the adsorbent. In determining the number of carbon atoms in the hydrocarbon arm, any functional groups substituted on the arm are ignored. Also, all branches are ignored and the longest continuous chain is named in accordance with the IUPAC nomenclature.

The hydrocarbon arm need not be terminated in a hydrogen but also can be terminated in a functional group, e.g. ionic groups such as $NH_2$, $SO_3H$, $PO_4H_2$, SH, imidazoles, phenolic groups, etc. or non-ionic radicals such as OH and $CONH_2$.

The adsorbents of this invention can be described by the formula A—B—C—D. A represents the core or carrier, e.g., the agarose. B is the covalent linking group. C is the hydrocarbon group and D is the terminal group.

Affinity chromatography adsorbents are prepared by first attaching the hydrocarbon arm to the biospecific ligand and then attaching the other end of the hydrocarbon arm to the carrier or core, or by attaching the arm to the carrier and thereafter attaching the other end of the arm to the ligand. The adsorbent of the present invention is prepared in the same manner as the latter method omitting, of course, attachment of the ligand. For example, the agarose is first activated by reaction with cyanogen bromide and then reacted with an alpha, omega-diaminoalkane to produce an omega-aminoalkyl-agarose.

A particular macromolecule such as a protein, enzyme, lipid, etc., will be selectively and reversibly bound to an adsorbent having a particular number of carbon atoms in its hydrocarbon arm. The number of carbon atoms necessary for selective and reversible binding differs for each macromolecule. It is believed that this is the result of a difference in size of the available hydrophobic pockets in the individual macromolecules. For example, a homologous series of hydrocarbon coated agaroses that varied in the length of their alkyl side chains [agarose-NH—$(CH_2)_n$H] was used to adsorb glycogen phosphorylase. The adsorbents differ remarkably in their capacity to bind the enzyme — passing from no retention ($n = 1$), through retardation ($n = 3$), to reversible binding ($n = 4$), up to very tight binding ($n = 6$) — as the hydrocarbon chain was gradually lengthened. Under the conditions of the experiment very few other proteins were reversibly retained by the butyl-agarose column. This procedure amazingly afforded up to a 100-fold purification of the enzyme in a single step.

The existence of an ionic group terminating the hydrocarbon chain will affect the number of carbon atoms necessary to selectively bind a particular macromolecule. For example, while in the alkyl-agarose series, side chains 4 carbon atoms long sufficed to retain glycogen phosphorylase, 6 carbon atom side chains were needed to retain this enzyme in the omega-aminoalkyl-agarose series. Similarly 1–2 carbon atom arms sufficed to retain glycogen synthetase in the alkyl agarose series; however, four carbon atom arms were needed to retain this enzyme when using the omega-aminoalkyl-agarose series.

Those skilled in the art will recognize that there are various variables which can be adjusted during the hydrophobic chromatography of the present invention. Such variables include loading and eluting conditions, such as ionic strength, buffer composition, pH, temperature, addition of a small amount of an organic solvent, etc. However, such variables are routinely adjusted in this field and those skilled in the art can readily establish optimum conditions.

In order to deterine which adsorbent will selectively and reversibly bind a given macromolecule, a series of chromagraphic columns is set up and each is loaded with one member of the homologous series of the hydrocarbon arm containing agarose. A small amount of the macromolecule solution is passed through the column. Then the eluting conditions are changed and the resulting effluent is analyzed for the presence of the macromolecule and its purity by procedures known in the art.

The following Examples are set forth to further illustrate the invention but is not intended to limit it. Unless otherwise specified throughout this specification and claims, all parts and percentages are by weight and all temperatures are in degrees centigrade.

EXAMPLE 1

Glycogen phosphorylase b was prepared by the method of Fisher et al, Biochem. Prep. 6, 68 (1958) and recrystallized three times before use. The enzyme was freed from AMP (Adenosine 5'-monophosphate) by passage through a charcoal-cellulose column and assayed by the method of Hedrick et al, Biochem., 4, 1337 (1965). Enzyme concentrations were determined spectrophotometrically using an absorbent index $A_{280}^{1\%} = 13.1$. D-glyceraldehyde 3-phosphate dehydrogenase (GAPD) was assayed by the method of Velick, Meth. Enzymol., 1, 401 (1955) and its concentration was determined using an absorbent index $A_{280}^{1\%} = 10.0$.

Minced rabbit skelatal muscle was extracted with 2.5 liters of water per kg of meat. Extraction was allowed to proceed for 15 minutes at 22° and then the mixture was poured through cheese cloth and allowed to drain. After centrifugation for 40 minutes at 3,000 g, the supernatant was filtered through glasswool to obtain the crude abstract used here for the isolation of phosphorylase.

Agarose (Sepharose 4B) was activated by CNBr at pH 11 and 22° by addition of 1 g CNBr to 10 g (wet weight) of the agarose. The reaction was allowed to proceed for 8 minutes, maintaining the pH at 11 with 5N NaOH. Activation was terminated by filtration and washing of the gel with icecold de-ionized water. Meanwhile, solutions of each member of a homologous series of alkyl amines (methylamine to decylamine) in 40% dioxane was prepared and acidified to pH 9.0 with 6N HCl. The activated agarose was then suspended in cold 0.1 M $NaHCO_3$ and mixed with an equal volume of the alkyl amine solution. Dioxane was added to the slurry to a final concentration of 40% to keep the alkyl amine in solution. The reaction mixture now contained 4 moles of the alkyl amine per mole of CNBr used for the activation of the agarose. The alkyl amine was allowed to react with the activated agarose at 4° for 24 hours. Subsequently, the hydrocarbon coated agarose was washed with water, 0.1 M $NaHCO_3$, 0.05 M NaOH and 0.1 M $CH_3COOH$, then water again. Under the microscope, the coated beads appeared identical to the unmodified agarose. In this manner, hydrocarbon coated agarose in which the hydrocarbon arm had one, two, three, four, five, six, seven, eight, nine and 10 carbon atoms, respectively, were prepared.

Each member of the hydrocarbon modified agarose homologous series was loaded into a short column and mixtures of GAPD and phosphorylase b were passed through the columns. It was found that the GAPD was not absorbed or retarded by any of the columns ($C_1$–$C_6$). However, while the $C_1$ column did not retain phosphorylase b, the $C_3$ column retarded the enzyme and the higher alkyl agarose ($C_4$–$C_6$) absorbed it. Elution of phosphorylase b from the columns on which it was absorbed was not possible merely by increasing the ionic strength with sodium chloride (up to 0.5 M), but using a deforming buffer (0.4 imidazole and 0.05 M 2-mercaptoethanol, adjusted to pH 7.0 with citric acid), the enzyme could be eluted from $C_4$ but not from $C_6$. The binding of phosphorylase b to the $C_6$ hydrocarbon modified agarose was very tight since the enzyme could not be eluted even when the pH of the deforming buffer was lowered to 5.8. Recovery of the enzyme from the $C_6$ column was possible only in the denatured form by washing the column with 0.2 M acetic acid.

EXAMPLE 2

The crude muscle extract prepared as described above was passed through the $C_4$ hydrocarbon modified agarose column. Over 95% of the proteins (based on absorption at 280 nm) are excluded from the column. These fractions exhibit essentially no phosphorylase activity as measured in the presence of AMP. Upon elution with the deforming buffer, a small amount of protein emerges from the column, with very high phorphorylase activity. The specific activity of the eluted enzyme (after dialyzing out the deforming buffer) is up to 68 units/mg, which is very close to that reported for the pure, crysalline enzyme (80 units/mg). The crude extract had a phosphorylase activity of 0.7 units/mg and the specific activity of the enzyme purified in the $C_4$ column was up to 68 units/mg. Therefore, roughly a 100-fold purification in a single step was achieved. Moreover, the yield of the process was over 95%, based on activity measurement.

EXAMPLE 3

Agarose (Sepharose 4B) was activated at pH 10.5 –11 and 22° by addition of 1 g of CNBr to 10 g (wet weight) of agarose. The reaction was allowed to proceed for 8 minutes and the pH was maintained between 10.5 and 11 by addition of 5 N NaOH. Activation was terminated by filtration and washing of the gel with iced-cold deionized water. The activated agarose was suspended in cold 0.1 M $NaHCO_3$ (pH 9) (about twice the settled volume of the gel) and mixed with an equal volume of water containing 4 moles of an alpha, omega-diamino alkane [$NH_2(CH_2)_nNH_2$] per mole of CNBr used for activation of the agarose. The pH of the diamine was adjusted to 9 with 6 N HCl before mixture with the activated agarose. Coupling was performed at 4° or at 25° for 24 hours, while the reaction mixture was gently swirled. Subsequently, the omega-aminoalkyl-agarose was washed with water, 0.1 M $NaHCO_3$, 0.05 M NaOH, water, 0.1 M acetic acid, and then with water again. Finally, the columns were equilibrated with a buffer composed of 50 mM beta-glycerophosphate-50 mM 2-mercaptoethanol-1 mM ethylenediaminetetraacetic acid (pH 7). All of the agarose derivatives thus prepared were identical in the number of their amino groups per unit weight, as determined by reaction with 2,4,6-trinitrobenzene sulfonate.

Minced skeletal muscle from rabbit (1 kg) was suspended in 4 liters of 50 mM tris.HCl-50 mM ethylene-diaminetetraacetic acid (pH 8.1) and homogenized in a large capacity Waring blender for 1 minute. The homogenate was then centrifuged at 5860 × g and the supernatant was filtered through glasswool. An equal volume of neutralized saturated $(NH_4)_2SO_4$ solution was added and, after 24 hours at 4°, the supernatant was decanted. The settled precipitate was then centrifuged for 20 minutes at 16,300 × g. The resulting pellet was suspended (and partially dissolved) in twice its volume of 50 mM beta-glycerophosphate-50 mM 2-mercaptoethanol-1mM ethylene-diaminetetraacetic acid (pH 7). The suspension was dialyzed twice against twenty times its volume of the beta-glycerol-phosphate buffer, then centrifuged at 35,000 × g for 3 hours. The resulting partially clarified solution contained 70% of the glycogen synthetase activity and 40% of the glycogen phosphorylase activity found in the glasswool filtrate before precipitation with $(NH_4)_2SO_4$.

Glycogen synthetase was assayed in the presence and the absence of glucose-6-phosphate, as described by Soderling et al, *J. Biol. Chem.* 245, 6317–6328 (1970). 1 unit of activity is defined as the amount of enzyme that catalyzed (under the standard assay conditions) the incorporation of 1 $\mu$ mol of glucose per minute from UDP-glucose into glycogen.

Glycogen phosphorylase was assayed as in Example 1. 1 unit of activity is defined as the amount of enzyme causing the release of 1 $\mu$ mol of inorganic phosphorylase from glucose-1-phosphorylase per minute.

The electrophoresis of the acrylamide was performed with 5% gels in the presence of 0.1% sodium dodecyl sulfate-10 mM 2-mercaptoethanol (pH 7.2) as described by Dudai et al, Biochim. Biophys. Acta 268, 138–157 (1972). Protein concentrations were determined by the Biuret method, *J. Bio. Chem.* 177, 751–766 (1949).

In preparing the homolgous series of omega-aminoalkyl-agaroses, [agarose-NH-$(CH_2)_n$-$NH_2$] a large excess of the diamine was used to reduce the probability of cross-linking. The hydrocarbon arm of the agaroses prepared contained two, three, four, five, six, seven, eight, 10 and 12 carbon atoms, respectively. During coupling of the longer arms (seven carbon atoms and over) to the activated agarose, the solvent used was a 1:1 mixture of aqueous buffer and either dioxane or N,N'-dimethylformamide. The rabbit muscle extract was passed through short columns of each of these agarose derivatives. The emerging fractions were assayed for glycogen phosphorylase and glycogen synthetase, and their absorption at 280 mm was monitored. Both the synthetase and phosphorylase were excluded from the $C_2$ and $C_3$ columns. However, while glycogen phosphorylase was also excluded from the $C_4$ column, glycogen synthetase was retained by this column, from which it could be eluted by a linear sodium chloride gradient. Higher members of this homologous series of agarose derivatives ($n = 5-8$) bound the synthetase so tightly that it was possible to elute it only in denatured form. The phosphorylase was selectively bound by the $C_6$ column. Therefore, it is possible to isolate the synthetase by passage of the crude muscle extract through the $C_4$ column and then to extract the phosphorylase by subjecting the excluded proteins to chromatography in the $C_6$ column.

EXAMPLE 4

Following the procedure of Example 3, 70 ml of muscle extract containing 1750 mg of protein and a synthetase activity of 0.2 units/mg were applied on a short column (10 × 2.4 cm) of agarose-NH—$C_4$—$NH_2$. The column excluded a large amount of protein, including glycogen phosphorylase but no synthetase activity was detected in the excluded fractions. Upon application of a sodium chloride gradient, glycogen synthetase was eluted and the specific activity of the synthetase obtained was 5 units/mg, representing a 25-fold purification in one step. In a separate procedure, starting with muscle extracts that had a synthetase activity of only 0.09 units/mg, a 48-fold purification was achieved. The synthetase prepared by the procedures described above is not homogeneous on acrylamide gels in the presence of sodium dodecyl sulfate and 2-mercaptoethanol. However, by preparing a muscle extract as described, then subjecting it to chromatography on agarose-NH—C$_4$—NH$_2$, a purification of 350-fold was achieved with a 50% yield of activity.

EXAMPLES 5–11

Following the procedure of Example 3, a homologous series of omega-aminoalkyl-agarose (Sepharose 4B), i.e., agarose-NH—(CH$_2$)$_n$—NH$_2$, was prepared and the most effective members for a variety of biomolecules was determined. The following Table lists the biomolecule and its source, the column used by the carbon atom length of the arm, and the degree of purification achieved:

| Ex. | Biomolecule | Source | Column Used | Purification (fold) |
| --- | --- | --- | --- | --- |
| 5 | Histidinol Phosphate Aminotransferase | Salmonella Typhimirium | C$_6$ | 46 |
| 6 | Histidine Decarloxylase | Lactobacillus 30a | C$_{10}$ | over 10 |
| 7 | Ornithine Decarboxylase | Lactobacillus 30a | C$_5$ | 5–10 |
| 8 | Restriction Endonuclease(α-subunit) | E. Coli. B | C$_2$ | over 10 |
| 9 | Glutamine Synthetase | E. Coli. | C$_5$ or C$_6$ | 6 |
| 10 | ATP:Glutamine Synthetase Adenyl Transferase | E. Coli | C$_5$ or C$_6$ | 6 |
| 11 | Ketopantoate Hydroxymethyltransferase | E. Coli | C$_4$ | over 10 |

The hydrophobic columns of the present invention can be used repeatedly. They can withstand washing with 1 M NaOH and 1 M HCl and can be stored for months at 4° in aqueous suspension containing bacteriostatic agents. The columns have a high binding capacity and high flow rates (1–3 ml/min.). The major advantage of the columns is that they can be tailored to meet the requirements of specific macromolecules.

Various changes and modifications can be made in the process and products of this invention without departing from the spirit and the scope thereof. For example, a desired biomolecule can be purified by passing the impure material through a series of columns and binding all impuritities thereby eluting the pure desired molecule. The various embodiments set forth herein serve to further illustrate the invention but were not intended to limit it.

I claim:

1. In a method of selectively and reversibly binding biomolecules to an adsorbent in a chromatographic column by contact therewith, the improvement which comprises employing as the adsorbent a water-insoluble carrier having an arm attached thereto of the formula A—B—C—D, where A is the water-insoluble carrier, B—C—D represents the arm and individually B is a covalent linking group, C is a hydrocarbon group and D is a terminal group selected from the group consisting of hydrogen, ionic radicals and non-ionic radicals; provided that when said biomolecule is a lipophilic protein, B, C and D are other than a combination of —NH—, decyl, and amino or N—(3-carboxypropionyl) amino, respectively.

2. The method of claim 1, wherein A is agarose.
3. The method of claim 2, wherein said radicals are selected from the group consisting of —NH$_2$, —SO$_3$H, —CONH$_2$, —PO$_4$H$_2$, —OH, —SH, imidazole and phenolic groups.
4. The method of claim 3, wherein B is selected from the group consisting of —NH—, —S— and -COO-.
5. The method of claim 4, wherein C is alkyl, aryl, aralkyl, alkylaryl or alkyl aralkyl.
6. The method of claim 1, wherein A is agarose, B is -NH-, and C is alkyl.
7. The method of claim 6, wherein D is H.
8. The method of claim 6, wherein D is NH$_2$ and wherein said alkyl group contains one to 12 carbon atoms.
9. A method for determining which member of a homologous series of adsorbents each of which is a water-insoluble carrier having an arm attached of the formula A—B—C—D, wherein A is a water-insoluble carrier, B—C—D represents the arm and individually B is a covalent linking group, C is a hydrocarbon group, and D is a terminal group selected from the group consisting of hydrogen, ionic and non-ionic radicals, said series differing in the number of carbon atoms in C, will selectively and reversibly bind a given biomolecule which comprises contracting individual portions of a solution containing said biomolecule with individual members of said series, identifying which members of said series bind said biomolecule, changing the eluting conditions, and identifying which member of said series will release said biomolecule in a non-denatured form.
10. The method of claim 9, wherein A is agarose, B is —NH, and C is alkyl.
11. The method of claim 10, wherein D is H.
12. The method of claim 10, wherein D is NH$_2$ and wherein said alkyl group contains one to 12 carbon atoms.
13. A package containing a series of chromatographic columns, each containing a reagent which is a water-insoluble carrier having an arm attached thereto of the formula A—B—C—D as the adsorbent wherein A is a water-insoluble carrier, B—C—D represents the arm and individually B is a covalent linking group, C is a hydrocarbon group, and D is a terminal group selected from the group consisting of hydrogen, ionic radicals and non-ionic radicals, the reagents in said columns differing in the number of carbon atoms in C and forming a homologous series of reactants.
14. The package of claim 13, wherein A is agarose.
15. The package of claim 14, wherein said radicals are selected from the group consisting of —NH$_2$, —SO$_3$H, —PO$_4$H$_2$, —OH, —SH, CONH$_2$, imidazole and phenolic groups.
16. The package of claim 15, wherein B is selected from the group consisting of —NH—, —S— and —COO—.
17. The package of claim 16, wherein C is alkyl, aryl, aralkyl, alkylaryl or alkyl aralkyl.
18. The package of claim 13, wherein A is agarose, B is —NH—, and C is alkyl.
19. The package of claim 18, wherein D is H.
20. The package of claim 18, wherein D is NH$_2$ and wherein said alkyl group contains one to 12 carbon atoms.

* * * * *